(12) United States Patent
Murayama et al.

(10) Patent No.: US 11,320,340 B2
(45) Date of Patent: May 3, 2022

(54) GAS SENSOR CONTROL DEVICE

(71) Applicant: DENSO CORPORATION, Kariya (JP)

(72) Inventors: Yuki Murayama, Kariya (JP); Shoki Shimizu, Kariya (JP); Hiroki Ichikawa, Kariya (JP); Akari Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 16/775,393

(22) Filed: Jan. 29, 2020

(65) Prior Publication Data
US 2020/0249124 A1    Aug. 6, 2020

(30) Foreign Application Priority Data
Jan. 31, 2019    (JP) .............................. JP2019-015613

(51) Int. Cl.
*G01M 15/10*    (2006.01)
*G01N 27/406*    (2006.01)
*G01N 27/407*    (2006.01)

(52) U.S. Cl.
CPC ...... *G01M 15/104* (2013.01); *G01N 27/4065* (2013.01); *G01N 27/4073* (2013.01)

(58) Field of Classification Search
CPC ............ G01M 15/104; G01N 27/4065; G01N 27/4073; G01N 27/4175
See application file for complete search history.

(56) References Cited

U.S. PATENT DOCUMENTS

| | | | |
|---|---|---|---|
| 10,019,854 B1 * | 7/2018 | McQuillen | .......... F02D 41/1495 |
| 2009/0223820 A1 | 9/2009 | Ishiguro et al. | |
| 2017/0184536 A1 * | 6/2017 | Kawamoto | ........ G01N 27/4074 |

FOREIGN PATENT DOCUMENTS

JP    B2-4767621    9/2011

* cited by examiner

*Primary Examiner* — Freddie Kirkland, III
(74) *Attorney, Agent, or Firm* — Nixon & Vanderhye P.C.

(57) ABSTRACT

A control device performs deterioration diagnosis of a gas sensor including a pump cell and a sensor cell. The control device includes a control unit, a determination value acquisition unit, a diagnosis unit, and a correction unit. The control unit temporarily reduces the oxygen removal capability of the pump cell. The determination value acquisition unit acquires an output ratio of the sensor cell based on an output value of the sensor cell in a state where the oxygen removal capability of the pump cell is temporarily reduced. The diagnosis unit performs deterioration diagnosis of the gas sensor by comparing the output ratio with a determination threshold. The correction unit sets a correction coefficient based on an atmospheric pressure and an oxygen concentration, and also corrects the output ratio using the correction coefficient.

10 Claims, 17 Drawing Sheets

GAS SENSOR CONTROL DEVICE

CROSS-REFERENCE TO RELATED APPLICATION

This application is based on and claims the benefit of priority from earlier Japanese Patent Application No. 2019-015613 filed Jan. 31, 2019, the description of which is incorporated herein by reference.

TECHNICAL FIELD

The present disclosure relates to a gas sensor control device.

BACKGROUND

Some vehicles are equipped with a gas sensor that detects the concentration of a specific gas component contained in the exhaust gas discharged from an internal combustion engine, such as the concentration of nitrogen oxides. In such a gas sensor, there is a possibility that the detection accuracy of the concentration of the gas component may decrease, for example, due to deterioration. For this reason, a gas sensor control device performs processing that diagnoses the extent of deterioration of the gas sensor. Control devices that execute such diagnosis processing include the control device described in JP 4767621 B. In order to ensure diagnosis accuracy, the control device described in JP 4767621 B performs the diagnostic processing of the gas sensor on the condition that the temperature of the exhaust gas exceeds a predetermined temperature during a post-operation period of the control device after the internal combustion engine is switched off, and an excess air ratio of the exhaust gas exceeds a predetermined threshold.

In addition, the gas sensor control device described in JP 4767621 B ensures diagnosis accuracy by performing deterioration diagnosis of the gas sensor only when the condition above is satisfied. However, since deterioration diagnosis of the gas sensor is not performed when the condition above is not satisfied, there is a possibility that the execution frequency of the deterioration diagnosis will become significantly reduced.

The present disclosure has been made in view of such circumstances, and has an object of providing a gas sensor control device that enables deterioration diagnosis of a gas sensor with both a high accuracy and execution frequency.

SUMMARY

A gas sensor control device in an aspect includes a first cell, which removes oxygen contained in an exhaust gas of an internal combustion engine of a vehicle, and a second cell, which outputs a current corresponding to a concentration of a specific gas contained in the exhaust gas, from which oxygen has been removed by the first cell. The gas sensor control device includes a control unit, a determination value acquisition unit, a diagnosis unit, and a correction unit. The control unit temporarily reduces an oxygen removing capability of the first cell. The determination value acquisition unit acquires a determination value for diagnosing deterioration of the gas sensor based on an output value of the second cell in a state where the oxygen removal capability of the first cell has been temporarily reduced. The diagnosis unit performs deterioration diagnosis of the gas sensor by comparing the determination value with a determination threshold. The correction unit sets a correction parameter based on at least one of an exhaust pressure, an atmospheric pressure, and a gas composition of an exhaust gas, and corrects any one of the output value, the determination value, and the determination threshold based on the correction parameter.

The diffusion rate of the exhaust gas in the gas sensor affects the deterioration diagnosis result of the gas sensor. Furthermore, the diffusion rate of the exhaust gas in the gas sensor depends on the exhaust pressure, the atmospheric pressure, and the gas composition of the exhaust gas. Therefore, according to the configuration described above, because any one of the output value of the second cell, the determination value, and the determination threshold used in the deterioration diagnosis of the gas sensor is corrected by the correction parameter, the effect of environmental factors such as the exhaust pressure, the atmospheric pressure, and the gas composition of the exhaust gas can be reflected in any one of the output value of the second cell, the determination value, and the determination threshold. Consequently, because the influence of the diffusion rate of the exhaust gas on the deterioration diagnosis of the gas sensor can be eliminated, the accuracy of deterioration diagnosis of the gas sensor can be increased. Moreover, if the influence of the diffusion rate of the exhaust gas in the gas sensor can be reflected in any one of the output value of the second cell, the determination value, and the determination threshold, the deterioration diagnosis of the gas sensor can be accurately performed even in a situation where the diffusion rate of the exhaust gas varies. Therefore, it is possible to increase the opportunities to perform deterioration diagnosis of the gas sensor compared to a conventional gas sensor control device. That is to say, it is possible to increase the execution frequency of deterioration diagnosis of the gas sensor.

A gas sensor control device in another aspect includes a first cell, which removes oxygen contained in an exhaust gas of an internal combustion engine of a vehicle, and a second cell, which outputs a current corresponding to a concentration of a specific gas contained in the exhaust gas from which oxygen has been removed by the first cell. The gas sensor control device includes a control unit, a determination value acquisition unit, a diagnosis unit, and a correction unit. The control unit temporarily reduces an oxygen removing capability of the first cell. The determination value acquisition unit acquires a determination value for diagnosing deterioration of the gas sensor based on an output value of the second cell in a state where the oxygen removal capability of the first cell has been temporarily reduced. The diagnosis unit performs deterioration diagnosis of the gas sensor by comparing the determination value with a determination threshold after stopping the internal combustion engine. The correction unit sets a correction parameter based on a state quantity of the internal combustion engine before stopping the internal combustion engine, and corrects any one of the output value, the determination value, and the determination threshold based on the correction parameter.

According to the configuration above, because the exhaust pressure and the gas composition of the exhaust gas are correlated with a state quantity of the internal combustion engine, it is possible to obtain functions and effects equivalent or similar to those of the gas sensor control device described above.

According to the present disclosure, it is possible to provide a gas sensor control device that enables deterioration diagnosis of a gas sensor with both a high accuracy and execution frequency.

DETAILED DESCRIPTION OF THE PREFERRED EMBODIMENTS

Figure 1:
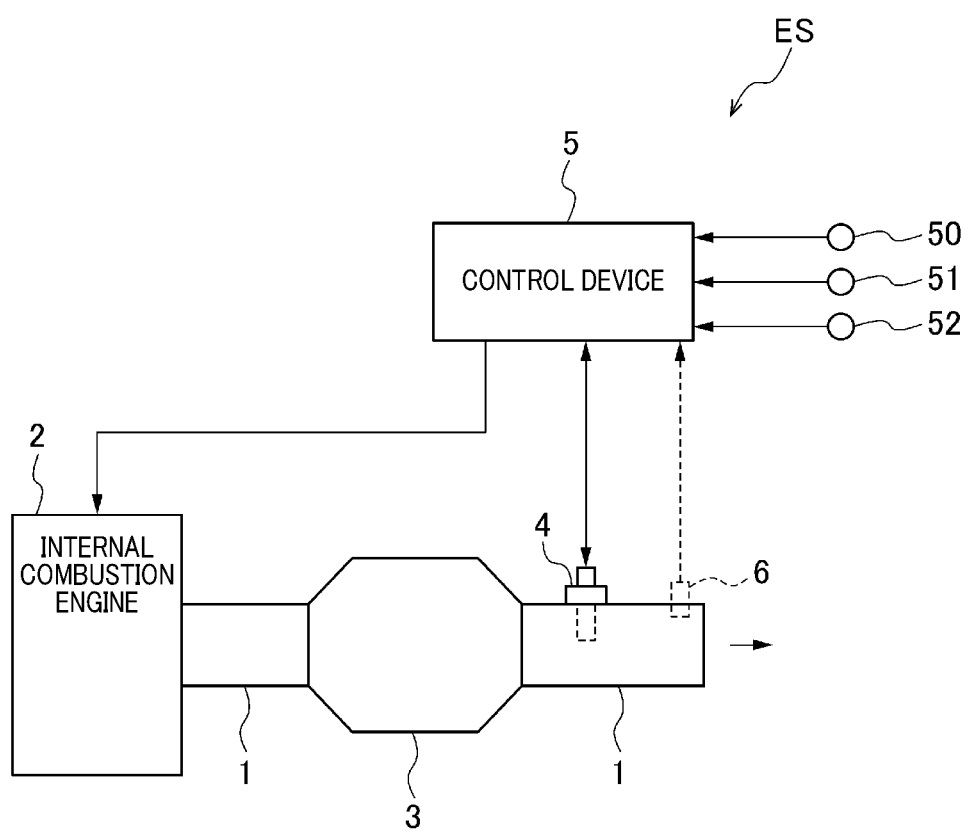
FIG. 1 is a diagram schematically showing a configuration of an exhaust system of a vehicle according to a first embodiment.

An embodiment of a gas sensor control device will be described below with reference to the drawings. In order to facilitate understanding of the description, the same components are denoted by the same reference numerals as much as possible in the drawings, and redundant description is omitted.

First Embodiment

A first embodiment of the gas sensor control device will be described. First, an outline of an exhaust system of a vehicle, on which a gas sensor of the present embodiment is mounted, will be described with reference to FIG. 1.

As shown in FIG. 1, in an exhaust system ES of a vehicle, an exhaust gas discharged from an internal combustion engine 2 flows through an exhaust passage 1. In the exhaust passage 1, an exhaust purification device 3 and a gas sensor 4 are provided in order from the internal combustion engine 2 side. The exhaust purification device 3 purifies harmful substances, such as carbon monoxide and nitrogen oxides, which are contained in the exhaust gas that flows through the exhaust passage 1. The gas sensor 4 detects the concentration of nitrogen oxides contained in the exhaust gas that has passed through the exhaust purification device 3, and also outputs a signal corresponding to the detected concentration of nitrogen oxides. Nitrogen oxides are also referred to as "NOx" below. The output signal of the gas sensor 4 is taken in by a control device 5. In the present embodiment, NOx corresponds to the specific gas.

The control device 5 is mainly configured by a microcomputer having a CPU and a memory and the like. The control device 5 takes in output signals from various sensors other than the gas sensor 4 which are mounted on the vehicle, such as the output signals from a crank angle sensor 50, an air flow meter 51, and an atmospheric pressure sensor 52. The crank angle sensor 50 detects the rotational speed of a crankshaft, which is an output shaft of the internal combustion engine 2. The air flow meter 51 detects the flow rate of air flowing through an intake passage of the vehicle, that is to say, the air intake amount of the internal combustion engine 2. The atmospheric pressure sensor 52 detects the atmospheric pressure. The control device 5 acquires information relating to the NOx concentration, the rotational speed of the internal combustion engine 2, and the atmospheric pressure based on the output signals of the sensors 4 and 50 to 52. The control device 5 controls the internal combustion engine 2 and the gas sensor 4 based on the information acquired by the sensors 4 and 50 to 52, and the vehicle state quantities detected by various sensors mounted on other vehicles.

In the present embodiment, although a control device 5 that controls both the internal combustion engine 2 and the gas sensor 4 is illustrated, a control device that controls the internal combustion engine 2 and a control device that controls the gas sensor 4 may be separately provided.

Next, the structure of the gas sensor 4 will be described in detail.

Figure 2:
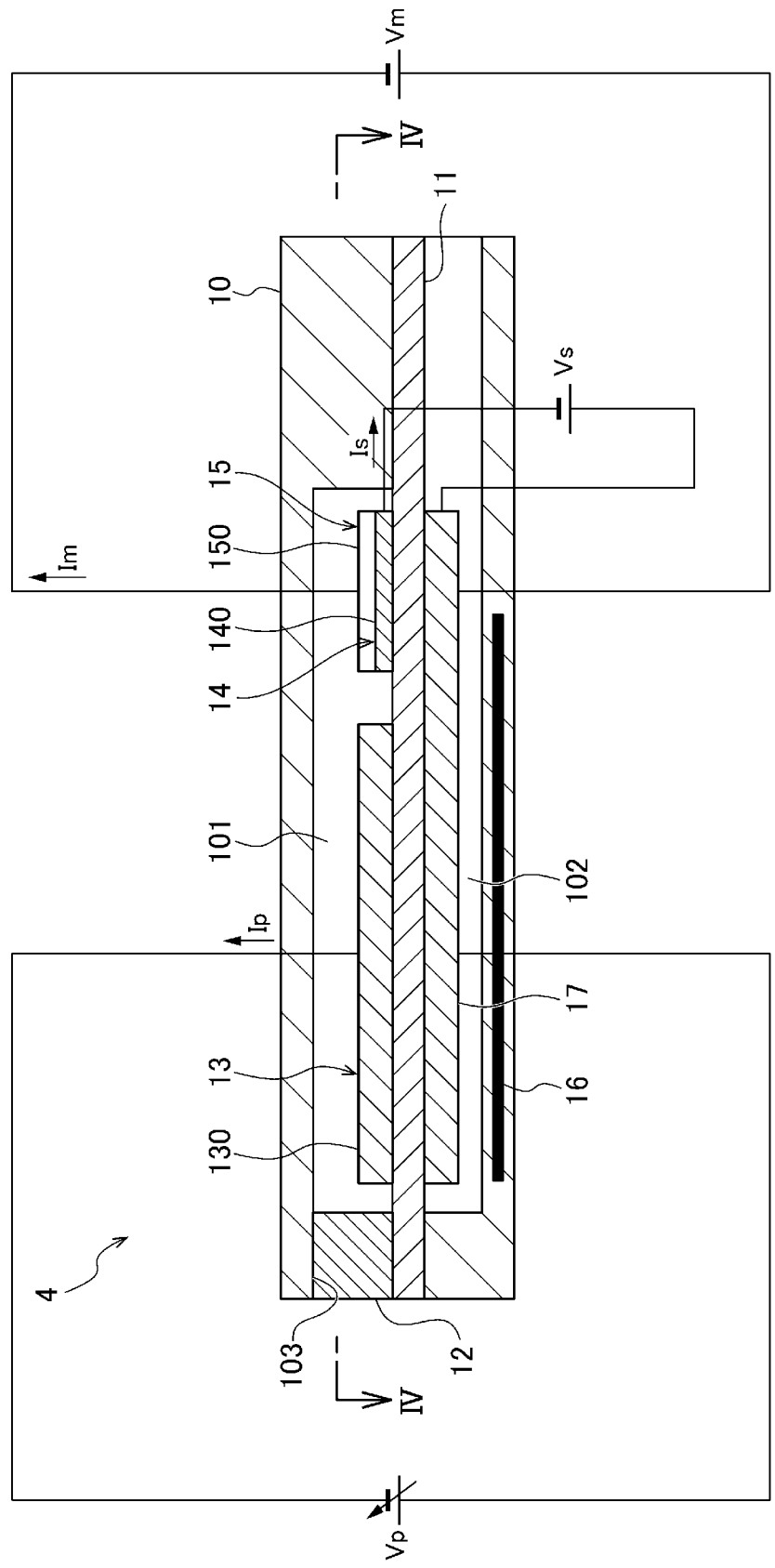
FIG. 2 is a cross-sectional view showing a cross-sectional structure of the gas sensor of the first embodiment.

As shown in FIG. 2, the gas sensor 4 includes a body portion 10, a solid electrolyte body 11, a diffusion resistor 12, a pump cell 13, a sensor cell 14, a monitor cell 15, and a heater 16.

The body portion 10 is disposed so as to sandwich the solid electrolyte body 11 in the thickness direction with a predetermined gap. One of the gaps formed between the body portion 10 and the solid electrolyte body 11 forms a measurement chamber 101. The body portion 10 is formed with an introduction hole 103 that penetrates from an outer peripheral surface to the measurement chamber 101. An exhaust gas flowing through the inside of the exhaust passage 1 is introduced into the measurement chamber 101 via the introduction hole 103. The other gap formed between the body portion 10 and the solid electrolyte body 11 constitutes an air chamber 102. Air is introduced into the air chamber 102 as a reference oxygen concentration gas through an air inlet provided in the gas sensor.

The diffusion resistor 12 is disposed inside the introduction hole 103. The diffusion resistor 12 is made of a porous member such as alumina, or a member having pores. The diffusion resistor 12 is provided to limit the amount of exhaust gas introduced into the measurement chamber 101.

The pump cell 13 is disposed at a position nearer the introduction hole 103 than the sensor cell 14 and the monitor cell 15. The pump cell 13 removes oxygen in the exhaust gas introduced from the introduction hole 103. In the present embodiment, the pump cell corresponds to a first cell.

The pump cell 13 is configured by a solid electrolyte body 11, a pump electrode 130 disposed on a surface of the solid electrolyte body 11 on the measurement chamber 101 side, and a common electrode 17 disposed on the surface of the solid electrolyte body 11 on the air chamber 102 side. The pump electrode 130 is composed of a NOx-inert electrode not damaged by NOx, such as an electrode formed of a Pt-Au (platinum-gold) alloy. The common electrode 17 is disposed so as to extend to regions that correspond to the sensor cell 14 and the monitor cell 15. A pump voltage Vp is applied between the pump electrode 130 and the common electrode 17. In the present embodiment, the pump voltage Vp corresponds to an applied voltage of the first cell.

Figure 3:
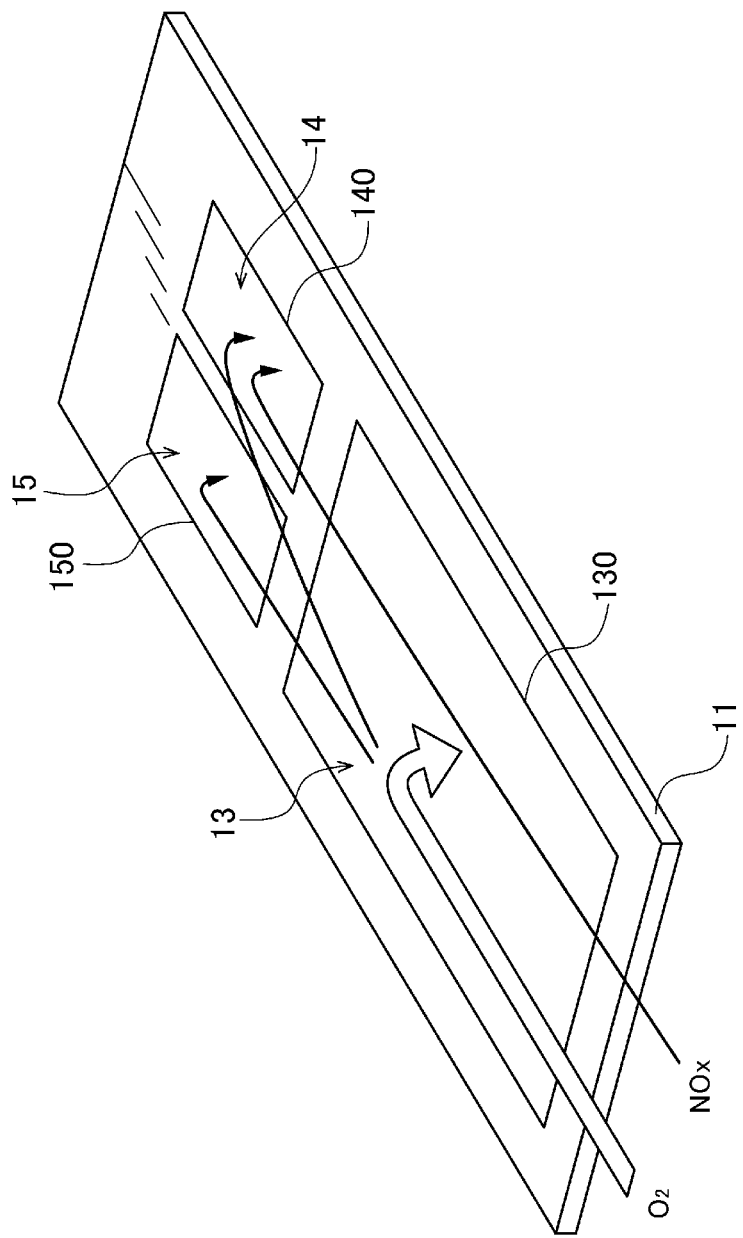
FIG. 3 is a perspective view showing a perspective structure of a diffusion resistor of the gas sensor of the first embodiment.

The exhaust gas introduced into the measurement chamber 101 through the introduction hole 103 makes contact with the pump electrode 130. As shown in FIG. 3, when the oxygen in the exhaust gas makes contact with the pump electrode 130, oxygen ions are generated at the pump electrode 130. The oxygen ions flow inside the solid electrolyte body 11 shown in FIG. 2 toward the common electrode 17, and discharge an electric charge in the common electrode 17 to form oxygen. The oxygen is released from the air chamber 102 to the air. A pump current Ip flows between the pump electrode 130 and the common electrode 17 according to the flow of the electric charge at this time. Therefore, the pump current Ip represents a value that corresponds to the amount of oxygen removed in the pump cell 13, or in other words, the oxygen concentration in the exhaust gas.

As shown in FIG. 2, the sensor cell 14 is disposed at a position further from the introduction hole 103 than the pump cell 13. The sensor cell 14 detects the NOx concentration in an exhaust gas which has passed through the pump cell 13. In the present embodiment, the sensor cell 14 corresponds to a second cell.

The sensor cell 14 includes a solid electrolyte body 11, a sensor electrode 140 disposed on a surface of the solid electrolyte body 11 on the measurement chamber 101 side, and a common electrode 17. The sensor electrode 140 is composed of a NOx active electrode that readily decomposes NOx, such as an electrode formed of a Pt-Rh (platinum-rhodium) alloy. A sensor voltage Vs is applied between the sensor electrode 140 and the common electrode 17.

The exhaust gas which has passed through the pump electrode 130, that is to say, the exhaust gas from which oxygen has been removed, makes contact with the sensor electrode 140. As shown in FIG. 3, when the NOx in the exhaust gas makes contact with the sensor electrode 140, the NOx in the exhaust gas is decomposed into nitrogen and oxygen at the sensor electrode 140. Furthermore, the residual oxygen that could not be removed by the pump electrode 130 also makes contact with the sensor electrode 140. The oxygen decomposed at the sensor electrode 140 and the residual oxygen in the exhaust gas make contact with the sensor electrode 140, thereby generating oxygen ions at the sensor electrode 140. The oxygen ions flow inside the solid electrolyte body 11 toward the common electrode 17, and discharge an electric charge in the common electrode 17 to form oxygen. The oxygen is released from the air chamber 102 to the air. A sensor current Is flows between the sensor electrode 140 and the common electrode 17 according to the flow of the electric charge at this time. Therefore, the sensor current Is represents a value corresponding to the NOx concentration and the concentration of residual oxygen in the exhaust gas.

Figure 4:
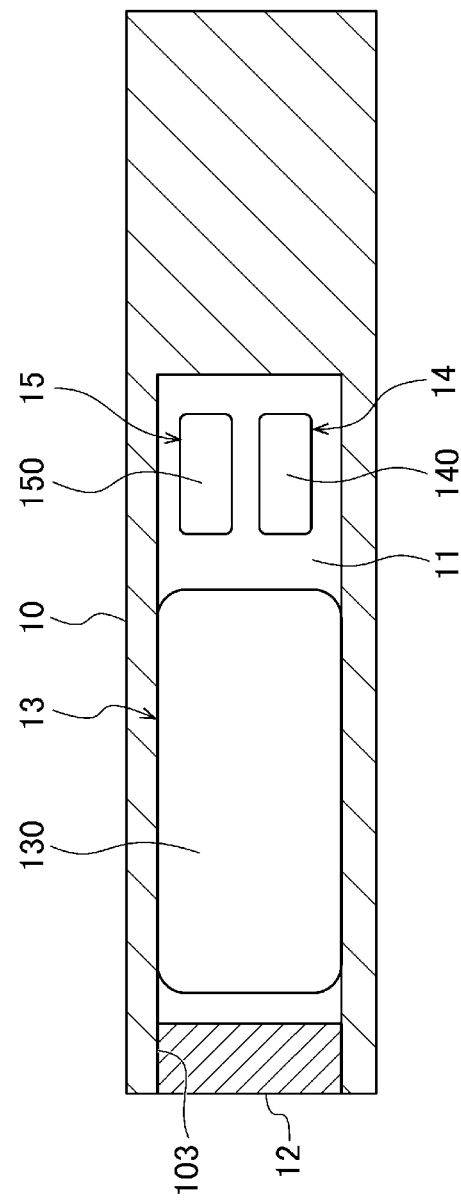
FIG. 4 is a cross-sectional view showing a cross-sectional structure along line IV-IV in FIG. 2.

As shown in FIG. 4, the monitor cell 15 is disposed so as to be aligned with the sensor cell 14. The monitor cell 15 detects the concentration of residual oxygen in an exhaust gas which has passed through the pump cell 13.

Specifically, as shown in FIG. 2, the monitor cell 15 includes a solid electrolyte body 11, a monitor electrode 150 disposed on a surface of the solid electrolyte body 11 on the measurement chamber 101 side, and a common electrode 17. The monitor electrode 150 is composed of a NOx-inert electrode which does not readily decompose NOx, such as an electrode formed of a Pt-Au (platinum-gold) alloy. A monitor voltage Vm is applied between the monitor electrode 150 and the common electrode 17.

Similar to the sensor electrode 140, the exhaust gas from which oxygen has been removed by the pump electrode 130 makes contact with the monitor electrode 150. As shown in FIG. 3, the residual oxygen in the exhaust gas makes contact with the monitor electrode 150, thereby generating oxygen ions at the monitor electrode 150. The oxygen ions flow inside the solid electrolyte body 11 toward the common electrode 17, and discharge an electric charge in the common electrode 17 to form oxygen. The oxygen is released from the air chamber 102 to the air. A monitor current Im flows between the monitor electrode 150 and the common electrode 17 according to the flow of the electric charge at this time. Therefore, the monitor current Im represents a value corresponding to the concentration of residual oxygen in the exhaust gas.

As shown in FIG. 2, the heater 16 is provided inside the body portion 10. The heater 16 generates heat based on energization, thereby heating the solid electrolyte body 11 and maintaining the temperature of the solid electrolyte body 11 at an activation temperature. The heater 16 is controlled by the control device 5.

Next, the electrical configuration of the control device 5 will be described with reference to FIG. 5.

Figure 5:
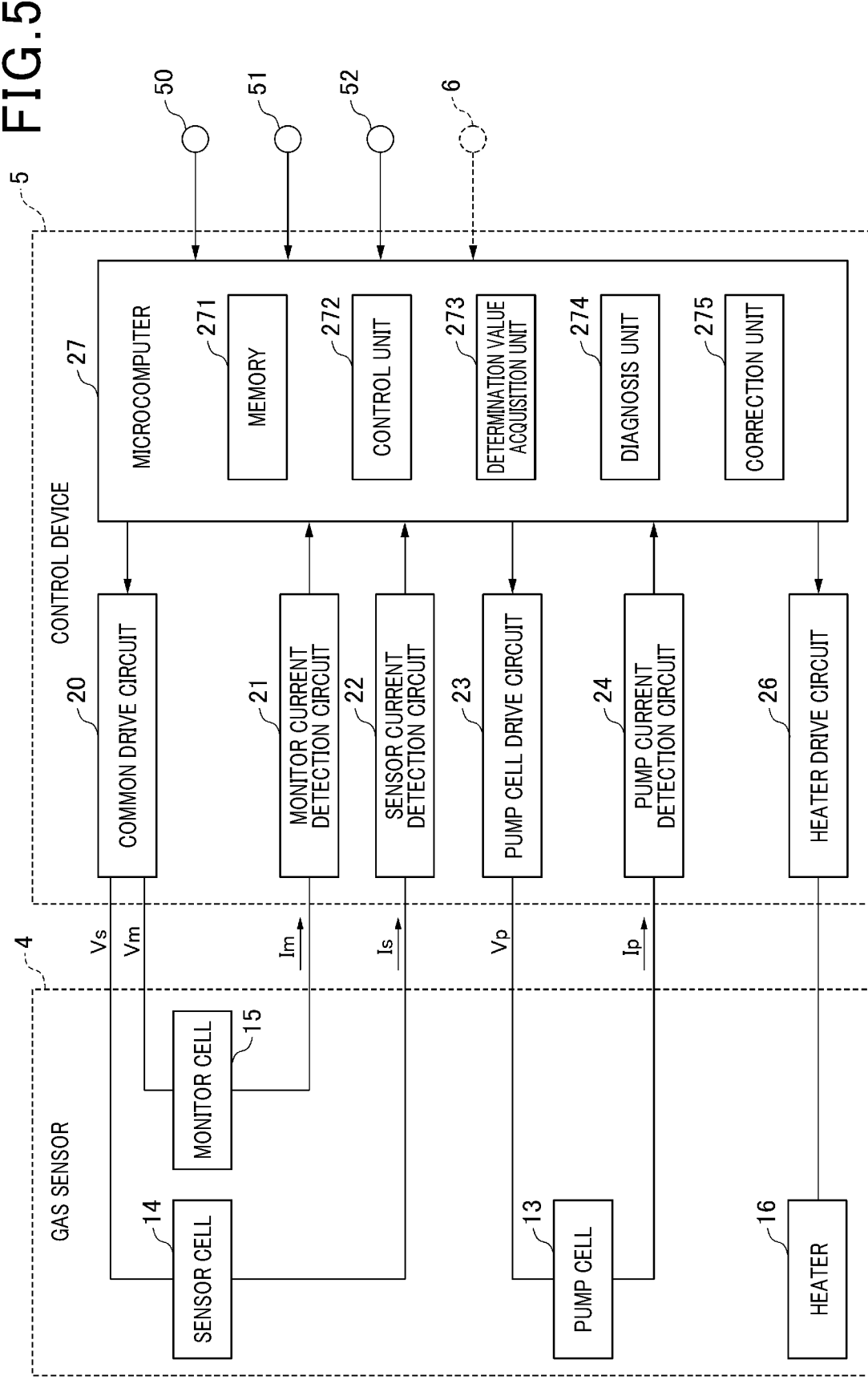
FIG. 5 is a block diagram showing a schematic configuration of a gas sensor control device of the first embodiment.

As shown in FIG. 5, the control device 5 includes a common drive circuit 20, a monitor current detection circuit 21, a sensor current detection circuit 22, a pump cell drive circuit 23, a pump current detection circuit 24, and a heater drive circuit 26.

The common drive circuit 20 applies a sensor voltage Vs to the sensor cell 14, and applies a monitor voltage Vm to the monitor cell 15. The sensor voltage Vs and the monitor voltage Vm are set to predetermined constant voltage values. The monitor current detection circuit 21 detects the monitor current Im, and also outputs a signal corresponding to the detected monitor current Im. The sensor current detection circuit 22 detects the sensor current Is, and also outputs a signal corresponding to the detected sensor current Is.

The pump cell drive circuit 23 applies the pump voltage Vp to the pump cell 13. The pump cell drive circuit 23 is also capable of changing the pump voltage Vp. The pump current detection circuit 24 detects a pump current Ip, and also outputs a signal corresponding to the detected pump current Ip.

The heater drive circuit 26 heats the heater 16 by energizing the heater 16.

The control device 5 further includes a microcomputer 27 having a memory 271 and the like. The microcomputer 27 takes in output signals from the current detection circuits 21, 22, and 24. The microcomputer 27 detects the monitor current Im, the sensor current Is, and the pump current Ip based on the output signals from the current detection circuits 21, 22, and 24. The microcomputer 27 adjusts the pump voltage Vp by controlling the pump cell drive circuit 23 based on the pump current Ip. Furthermore, the microcomputer 27 calculates the NOx concentration in the exhaust gas based on the sensor current Is and the monitor current Im.

Specifically, the sensor current Is correlates with the NOx concentration and the concentration of residual oxygen in the exhaust gas. Furthermore, the monitor current Im correlates with the concentration of residual oxygen in the exhaust gas. Therefore, by subtracting the monitor current Im from the sensor current Is, a current value corresponding to the NOx concentration in the exhaust gas can be obtained. The microcomputer 27 subtracts the monitor current Im from the sensor current Is, and calculates the NOx concentration based on the subtracted value.

Moreover, the microcomputer 27 controls the heater drive circuit 26 to adjust the amount of heat generated by the heater 16, such that the temperature of the solid electrolyte body 11 is maintained at a predetermined temperature. The predetermined temperature is the activation temperature of the solid electrolyte body 11.

Note that, in such a gas sensor 4, a variation in the sensor current Is occurs if the sensor cell 14 deteriorates due to deterioration or the like. Such a variation of the sensor current Is caused by deterioration of the sensor cell 14 affects the calculation accuracy of the NOx concentration. Therefore, the microcomputer 27 executes deterioration diagnosis processing that diagnoses the extent of deterioration of the sensor cell 14.

Specifically, the microcomputer 27 includes a control unit 272, a determination value acquisition unit 273, and a diagnosis unit 274. The control unit 272 temporarily reduces the pump voltage Vp to temporarily reduce the oxygen removal capability of the pump cell 13, and intentionally supplies an exhaust gas that includes oxygen to the sensor cell 14. As a result, the oxygen concentration detected by the sensor cell 14 increases. For example, as shown in FIGS. 6(A) and 6(B), if the pump voltage Vp is reduced at time t10, the sensor current gradually increases with time after time t10. The determination value acquisition unit 273 calculates the change per unit time $\Delta Is/\Delta t$ of the sensor current Is at that time, or in other words, the gradient of the sensor current Is. When the sensor cell 14 deteriorates, the change per unit time of the sensor current Is becomes smaller. Using this, the determination value acquisition unit 273 compares the change per unit time of the sensor current Is calculated by the determination value acquisition unit 273 with an initial value, to calculate an output ratio which represents a rate of change of sensor current Is from the initial stage. In the present embodiment, the output ratio of the sensor cell 14 acquired by the determination value acquisition unit 273 in this manner corresponds to a determination value. The diagnosis unit 274 diagnoses deterioration of the sensor cell 14, or in other words, deterioration of the gas sensor 4, by comparing the calculated output ratio with a predetermined determination threshold. In the present embodiment, the change per unit time of the sensor current Is corresponds to a parameter representing a transient response behavior of the sensor current Is. Hereinafter, for the sake of convenience, the change per unit time of the sensor current Is is abbreviated as "sensor current change rate".

On the other hand, the amount of oxygen detected by the sensor cell 14 when the oxygen removal capability of the pump cell 13 is temporarily reduced is affected, for example, by the gas diffusion from the pump cell 13 to the sensor cell 14, and is therefore inversely proportional to the exhaust pressure.

Specifically, during normal operation where deterioration diagnosis is not being performed, that is to say, in a situation where oxygen removal is performed normally in the pump cell 13, the sensor current Is is ideally obtained by the following expression f1. In expression f1, α is a predetermined constant, Pe is the exhaust pressure, and D is the diffusion coefficient.

$$Is = \alpha \times Pe \times D \tag{f1}$$

As shown in expression f1, the sensor current Is is proportional to the exhaust pressure Pe and the diffusion coefficient D. The diffusion coefficient D can be obtained by synthesizing a Knudsen diffusion coefficient and a molecular diffusion coefficient, and can be expressed by expression f2 when simplified. In expression f2, "T" is the exhaust temperature, and "M" is the molecular weight of each gas in the exhaust gas that reaches the sensor cell 14.

[Equation 1]

$$D \propto \frac{T\sqrt{T}}{Pe\sqrt{M}} \tag{f2}$$

As shown in expression f2, the diffusion coefficient D is inversely proportional to the exhaust pressure Pe, but the influence of the diffusion coefficient D is small in expression f1. Therefore, the sensor current Is changes so as to be substantially proportional to the exhaust pressure Pe. That is to say, the sensor current Is varies under the influence of the pressure of the exhaust gas that passes through the diffusion resistor 12. This becomes a source of error in the sensor current Is during normal operation.

In contrast, the amount of oxygen detected by the sensor cell 14 at the time of deterioration diagnosis of the sensor cell 14, that is to say, at the time the oxygen removal capability of the pump cell 13 is temporarily reduced, is greatly affected by the diffusion rate of the exhaust gas from the pump cell 13 to the sensor cell 14. The diffusion rate of the exhaust gas is correlated with the diffusion coefficient D in expression f2 above. Therefore, the sensor current Is at the time of deterioration diagnosis changes such that it is greatly influenced by the diffusion coefficient D expressed by the above equation f2. As shown in expression f2, the diffusion coefficient D is inversely proportional to the exhaust pressure Pe and the molecular weight M of the gas. Consequently, the sensor current Is at the time of deterioration diagnosis changes in inverse proportion to the exhaust pressure Pe. Furthermore, the sensor current Is at the time of deterioration diagnosis is influenced by the molecular weight of each gas in the exhaust gas reaching the sensor cell 14, and is particularly influenced by the molecular weight of oxygen, which varies significantly at the time of deterioration diagnosis.

Because the temperature of the solid electrolyte body 11 is maintained at a predetermined temperature by the control of the heater 16 executed by the microcomputer 27, the exhaust temperature T is substantially constant in the gas sensor 4. Therefore, the influence of the exhaust temperature T on the diffusion coefficient D is small. Consequently, the sensor current Is at the time of deterioration diagnosis is considered to be substantially unaffected by the exhaust temperature T.

As described above, the sensor current Is at the time of deterioration diagnosis varies under the influence of the exhaust pressure and the molecular weight of oxygen. This becomes a source of error in the sensor current Is during deterioration diagnosis. If an error exists in the sensor current Is, an error also exists in the output ratio of the sensor cell 14 calculated based on the sensor current Is, which may reduce the accuracy of deterioration diagnosis.

Figure 7:
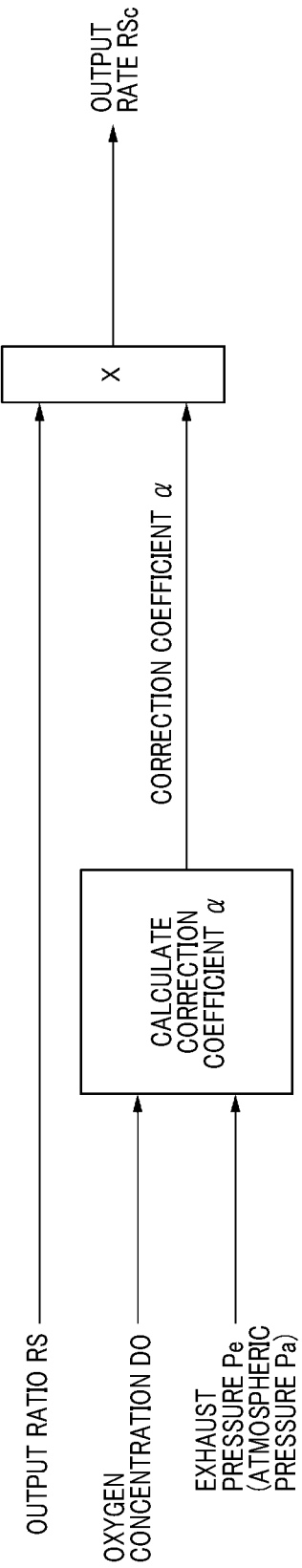
FIG. 7 is a diagram showing an outline of an output ratio correction executed by a correction unit of the first embodiment.

Therefore, as shown in FIG. 5, the microcomputer 27 of the present embodiment further includes a correction unit 275 for correcting the output ratio of the sensor cell 14. As shown in FIG. 7, the correction unit 275 calculates a correction coefficient $\alpha$ based on the exhaust pressure Pe and the oxygen concentration DO, and corrects the output ratio RS by multiplying the output ratio RS by the calculated correction coefficient $\alpha$. The memory 271 of the microcomputer 27 stores in advance a map such as that shown in FIG. 8, which represents the relationship between the exhaust pressure Pe, the oxygen concentration DO, and the correction coefficient $\alpha$. The correction unit 275 uses the map shown in FIG. 8 to calculate the correction coefficient $\alpha$ based on the exhaust pressure Pe and the oxygen concentration DO. The diagnosis unit 274 determines the deterioration of the sensor cell 14 by comparing the corrected output ratio RSc with a determination threshold.

In the present embodiment, the exhaust pressure Pe is substantially equal to the atmospheric pressure Pa if the internal combustion engine 2 is stopped, and the atmospheric pressure Pa is used instead of the exhaust pressure Pe. This is because the atmospheric pressure sensor 52 shown in FIG. 1 is used.

Next, a specific procedure of diagnostic processing executed by the microcomputer 27 will be described.

Figure 9:
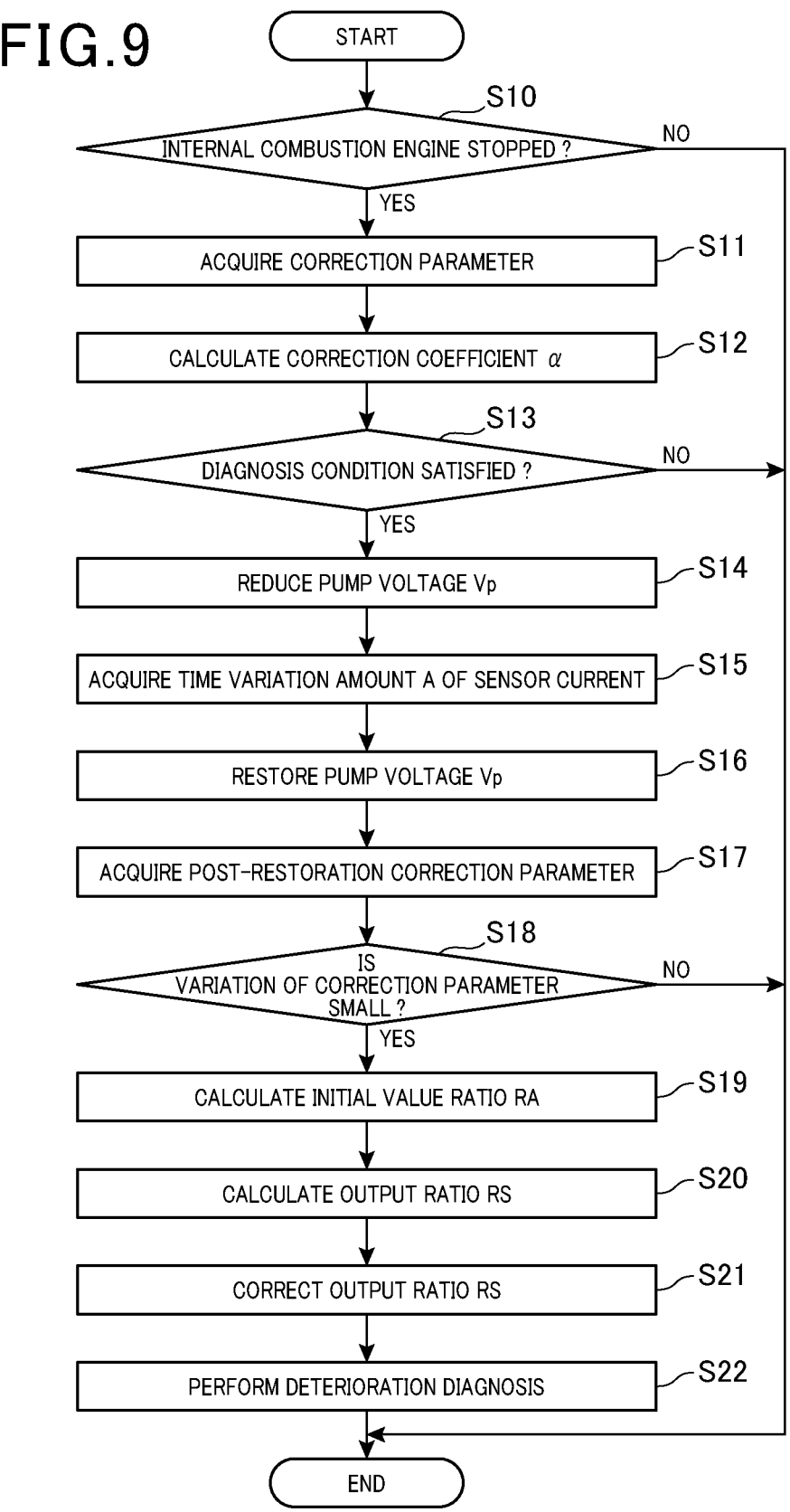
FIG. 9 is a flowchart showing the sequence of diagnostic processing executed by the gas sensor control device of the first embodiment.

As shown in FIG. 9, the diagnosis unit 274 firstly determines whether or not the internal combustion engine 2 is stopped as the processing of step S10. If the diagnosis unit 274 makes a negative determination in the processing of step S10, that is to say, if the internal combustion engine 2 is currently being driven, the diagnosis processing is temporarily terminated. In contrast, if the diagnosis unit 274 makes an affirmative determination in step S10, that is to say, if the internal combustion engine 2 is stopped, deterioration of the sensor cell 14 is diagnosed by executing the processing from step S11 onwards. This is because the gas environment in the exhaust passage 1 is more settled when the internal combustion engine 2 is stopped, and therefore, deterioration of the sensor cell 14 can be diagnosed with a higher accuracy.

The determination value acquisition unit 273 acquires correction parameters for calculating the correction coefficient $\alpha$ as the processing of step S11. The atmospheric pressure Pa and the oxygen concentration DO are used as correction parameters. Specifically, the determination value acquisition unit 273 acquires the atmospheric pressure Pa based on an output signal of the atmospheric pressure sensor 52. Further, the determination value acquisition unit 273 acquires the oxygen concentration DO based on the pump current Ip. In the present embodiment, the oxygen concentration DO corresponds to the gas composition of the exhaust gas.

Next, as the processing of step S12, the correction unit 275 uses the map shown in FIG. 7 to calculate the correction coefficient $\alpha$ from the atmospheric pressure Pa and the oxygen concentration DO, which are correction parameters. Then, the diagnosis unit 274 determines whether or not a diagnosis condition is satisfied as the processing of step S13. Specifically, the diagnosis unit 274 determines that the diagnosis condition is not satisfied when at least one of the following conditions (a1) to (a3) is satisfied.

(a1) The sensor cell 14 is in a non-activated state. The diagnosis unit 274 determines that the sensor cell 14 is in a non-activated state when the temperature of the solid electrolyte body 11 is lower than a non-activation temperature. The diagnosis unit 274 is capable of estimating the temperature of the solid electrolyte body 11 based on, for example, the pump current Ip detected when the pump voltage Vp is varied.

(a2) An abnormality has occurred in the gas sensor 4. Specifically, the diagnosis unit 274 determines that an abnormality has occurred in the gas sensor 4 when, for example, a disconnection has occurred in the wiring of the gas sensor 4, or a ground fault has occurred. The diagnosis unit 274 detects a disconnection or a ground fault based on, for example, the current values Ip, Is, Im indicating abnormal values.

(a3) The correction parameters are outside a predetermined range. Specifically, the diagnosis unit 274 determines whether or not the atmospheric pressure Pa and the oxygen concentration DO, which are correction parameters, are outside a predetermined range.

If the diagnosis unit 274 determines that the diagnosis condition is not satisfied, there is a possibility that deterioration of the sensor cell 14 may not be accurately diagnosed. Therefore, a negative determination is made in the processing of step S13, and the diagnosis processing is terminated.

Figure 6:
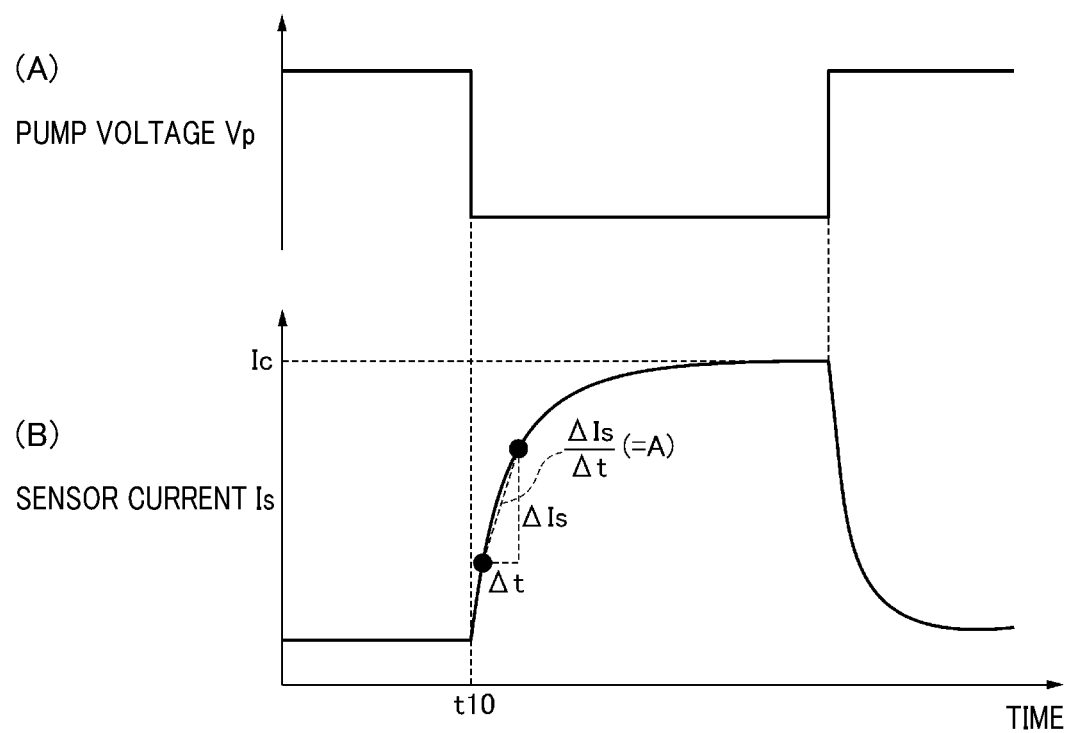
FIGS. 6(A) and 6(B) are timing charts showing variations in a pump voltage Vp and a sensor current Is in the gas sensor of the first embodiment.

If the diagnosis condition is satisfied, the diagnosis unit 274 makes an affirmative determination in the processing of step S13. In this case, the control unit 272 lowers the pump voltage Vp relative to normal operation as the processing of step S14. Then, as the processing of step S15, the determination value acquisition unit 273 calculates, as illustrated in FIG. 6, a time change amount A of the sensor current Is based on the sensor current Is detected during the period in which the pump voltage Vp is reduced. Next, as shown in FIG. 9, after the control unit 272 restores the pump voltage Vp to a normal value as the processing of step S16, the determination value acquisition unit 273 acquires a post-restoration correction parameter as the processing of step S17. Specifically, the determination value acquisition unit 273 acquires, as the post-restoration correction parameter, an atmospheric pressure Paa based on an output signal of the atmospheric pressure sensor 52 after the pump voltage Vp has been restored to a normal value, and acquires an oxygen concentration DOa based on the pump current Ip.

As the processing of step S18 following step S17, the diagnosis unit 274 determines whether or not the variation in the correction parameter before and after reducing the pump voltage Vp is small. Specifically, the diagnosis unit 274 determines whether or not the variation in the atmospheric pressure Paa acquired in the processing of step S17 is within a predetermined range relative to the atmospheric pressure Pa acquired in the processing of step S11. Furthermore, the diagnosis unit 274 determines whether or not the variation in the oxygen concentration DOa acquired in the processing of step S17 is within a predetermined range relative to the oxygen concentration DO acquired in the processing of step S11. If the diagnosis unit 274 makes a negative determination in the processing of step S18, that is to say, if the variation in the correction parameter before and after reducing the pump voltage Vp is not within a predetermined range, it is determined that the true value of the correction parameters are unknown, and the diagnosis processing is terminated.

If the diagnosis unit 274 makes a positive determination in the processing of step S18, that is to say, if the variation in the correction parameter before and after reducing the pump voltage Vp is not within a predetermined range, the determination value acquisition unit 273 calculates an initial value ratio RA of the output value of the sensor cell 14 as the processing in the following step S19. Specifically, the determination value acquisition unit 273 calculates the initial value ratio RA by dividing the time change amount A of the sensor current Is calculated in the processing of step S15 by an initial value A0. The initial value A0 represents the time change amount A of the sensor current Is when the pump voltage Vp is varied in the gas sensor 4 in an initial state without deterioration, and is obtained in advance through experiments or the like. The initial value A0 is stored in advance in the memory 271 of the microcomputer 27. The time change amount A of the sensor current Is decreases as the sensor cell 14 deteriorates. Therefore, the initial value ratio RA is a value that decreases as the sensor cell 14 deteriorates, and is an index value that indicates the extent of deterioration of the sensor cell 14.

Figure 10:
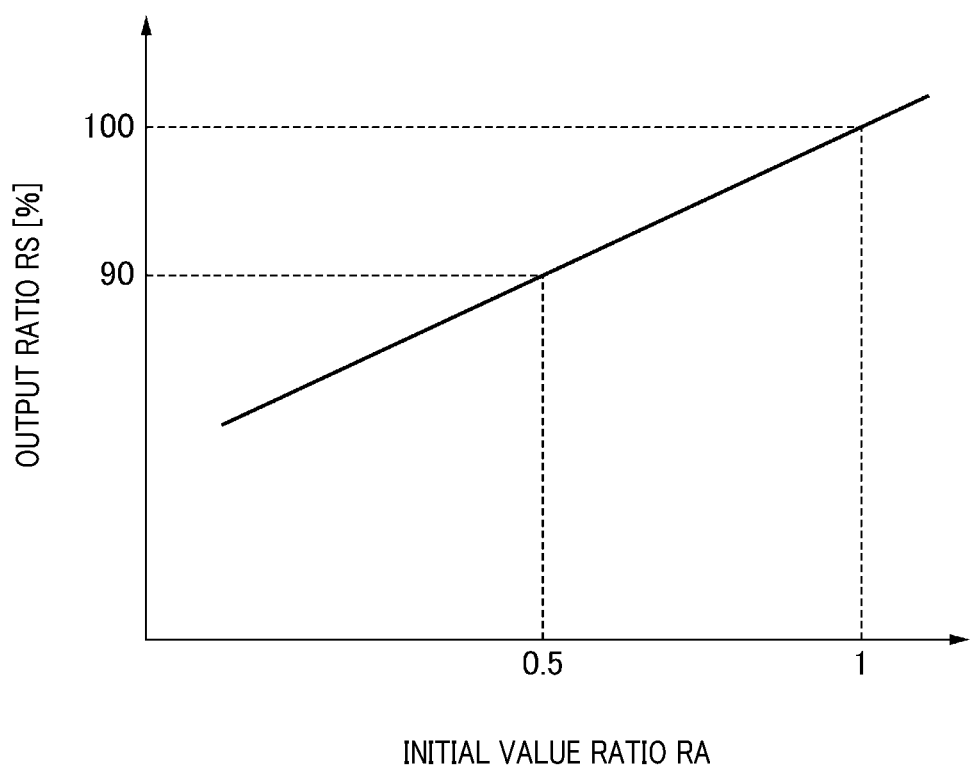
FIG. 10 is a map showing the relationship between an initial value ratio RA and an output ratio RS used in the gas sensor of the first embodiment.

As the processing of step S20 following step S19, the determination value acquisition unit 273 calculates, based on the initial value ratio RA, an output ratio RS which represents a rate of change of sensor current Is from the initial stage. For example, given a sensor current "Is0" output from the sensor cell 14 in an initial state under a certain condition, and a sensor current "Is1" output from the sensor cell 14 in the current state under the same condition, the output ratio RS represents a ratio of the sensor current Is1 to the sensor current Is0. That is to say, a relationship Is1=RS×Is0 is established between the sensor current Is0 and the sensor current Is1. The output ratio RS has, for example, the correlation shown in FIG. 10 with the initial value ratio RA calculated in the processing of step S19. In the present embodiment, a map that represents the relationship between the output ratio RS and the initial value ratio RA as shown in FIG. 10 is obtained in advance by experiments or the like, and is stored in the memory 271 of the microcomputer 27. The determination value acquisition unit 273 uses the map shown in FIG. 10 to calculate the output ratio RS based on the initial value ratio RA.

As shown in FIG. 9, as the processing of step S21 following step S20, the correction unit 275 multiplies the output ratio RS calculated in the processing of step S20 by the correction coefficient α calculated in the processing of step S12 to calculate a corrected output ratio RSc. Then, as the processing of step S22, the diagnosis unit 274 diagnoses deterioration of the gas sensor 4 based on the corrected output ratio RSc. Specifically, if the corrected output ratio RSc less than or equal to the determination threshold value RSth, the diagnosis unit 274 determines that the sensor cell 14 has deteriorated, and determines that deterioration has occurred in the gas sensor 4.

According to the control device 5 of the gas sensor 4 of the present embodiment described above, the operations and effects described in (1) to (6) below can be obtained.

(1) According to the gas sensor 4 of the present embodiment, the output ratio RS used for deterioration diagnosis of the gas sensor 4 is corrected by the atmospheric pressure Pa and the oxygen concentration DO, which are correction parameters. Therefore, the influence of environmental factors such as the atmospheric pressure Pa and the oxygen concentration DO can be reflected in the output ratio RS. Consequently, because the influence of the diffusion rate of the exhaust gas in the gas sensor 4 on the deterioration diagnosis can be eliminated, the accuracy of deterioration diagnosis of the gas sensor 4 can be increased. For example, since the atmospheric pressure Pa is different when the vehicle is traveling in lowlands and when traveling in highlands, the diffusion rate of the exhaust gas may vary. According to the control device 5 of the gas sensor 4 of the present embodiment, it is possible to improve the accuracy of deterioration diagnosis of the gas sensor 4 in such situations where the atmospheric pressure Pa is different. Furthermore, if the influence of the diffusion rate of the exhaust gas in the gas sensor 4 can be reflected in the output ratio RS, deterioration diagnosis of the gas sensor 4 can be accurately performed even in a situation where the diffusion rate of the exhaust gas varies. Therefore, it is possible to increase the opportunities to perform deterioration diagnosis of the gas sensor 4 compared to a conventional gas sensor control device. That is to say, it is possible to increase the execution frequency of deterioration diagnosis of the gas sensor 4.

(2) The correction unit 275 obtains the corrected output ratio RS by multiplying the output ratio RS by the correction coefficient α. As a result of such a configuration, it is possible to easily correct the output ratio RS, which is a determination value.

Figure 8:
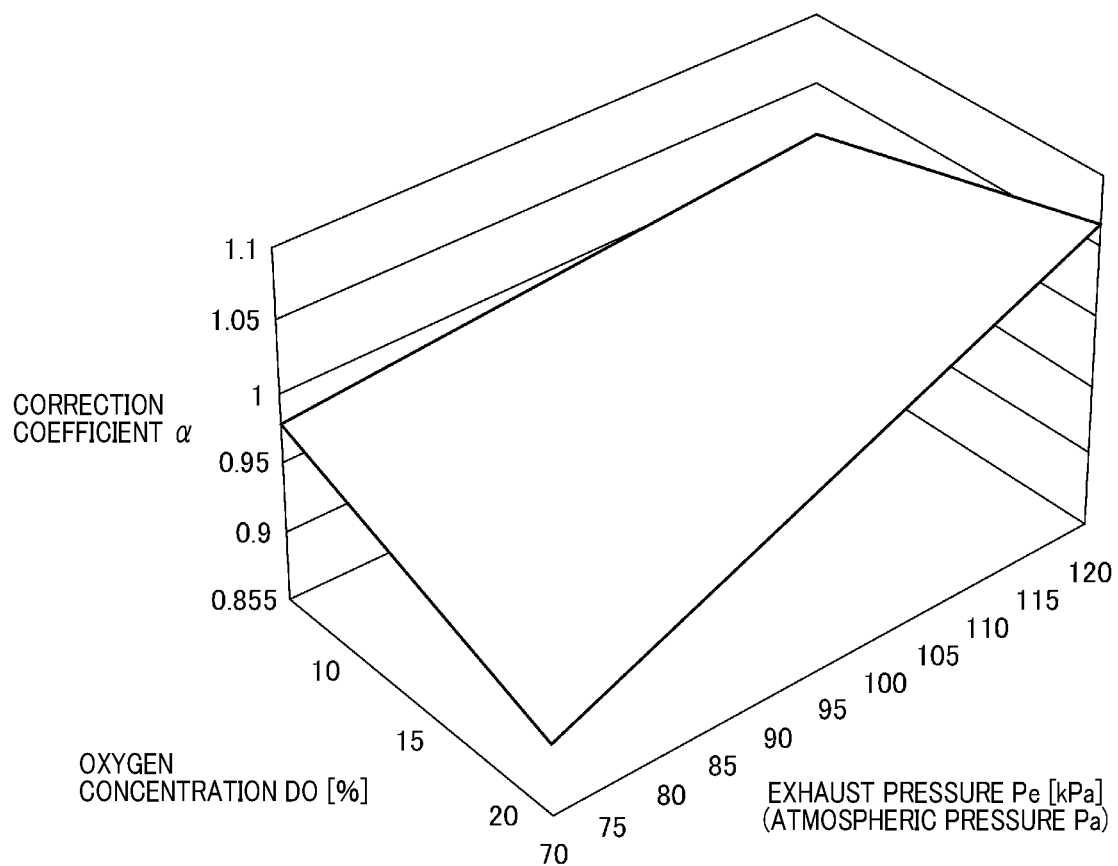
FIG. 8 is a map showing the relationship between an oxygen concentration DO, an exhaust pressure Pe, and a correction coefficient α used in the gas sensor of the first embodiment.

(3) The diagnosis unit 274 performs deterioration diagnosis of the gas sensor 4 after the internal combustion engine 2 is stopped. Furthermore, as a result of the correction unit 275 using at least the atmospheric pressure Pa as a correction parameter, as shown in FIG. 8, the correction coefficient α is set to a smaller value as the atmospheric pressure Pa decreases. That is to say, the correction unit 275 corrects the output ratio RS such that the corrected output ratio RSc becomes smaller as the atmospheric pressure Pa decreases. According to such a configuration, because the exhaust pressure Pe after the internal combustion engine 2 is stopped is substantially equal to the atmospheric pressure Pa, the atmospheric pressure Pa can replace the exhaust pressure Pe, which is a correction parameter. Consequently, if the atmospheric pressure sensor 52 is mounted on the vehicle, a sensor that detects the exhaust pressure Pe is not necessary. Therefore, the structure can be simplified.

(4) The control unit 272 temporarily reduces the oxygen removal capability of the pump cell 13 by reducing the pump voltage Vp. The determination value acquisition unit 273 calculates, as an output value of the sensor cell 14, the time change amount A of the sensor current Is output from the sensor cell 14 when the oxygen removal capability of the pump cell 13 is temporarily reduced. The correction unit 275 calculates the initial value ratio RA from the time change amount A of the sensor current Is, and calculates, based on the calculated initial value ratio RA, the output ratio RS which represents a rate of change of sensor current Is from the initial stage. The diagnosis unit 274 determines whether or not the sensor cell 14 has deteriorated by comparing the output ratio RS with a determination threshold RSth. In such a configuration, because the sensor current Is changes according to the diffusion rate of the exhaust gas, the time change amount A of the sensor current Is is particularly sensitive to the diffusion rate of the exhaust gas. For this reason, the diffusion rate of the exhaust gas tends to greatly affect the diagnosis result of the sensor cell 14. Therefore, as described in the present embodiment, it is particularly effective to employ a configuration in which the influence of the exhaust gas diffusion rate on the deterioration diagnosis of the sensor cell 14 is reduced by correcting the output ratio RS based on the correction coefficient α.

(5) The correction unit 275 corrects the output ratio RS when the atmospheric pressure Pa and the oxygen concentration DO, which are correction parameters, are within a predetermined range. The diagnosis unit 274 prohibits deterioration diagnosis of the gas sensor 4 if any one of the following conditions are satisfied: the atmospheric pressure Pa and the oxygen concentration DO are outside the predetermined range; the sensor cell 14 is in a non-activated state; or an abnormality has occurred in the gas sensor 4. For this reason, because the output ratio RS can be corrected with a higher accuracy, the accuracy of deterioration diagnosis of the gas sensor 4 can consequently be improved.

(6) The diagnosis unit 274 prohibits deterioration diagnosis of the gas sensor 4 if the deviation between the atmospheric pressure Pa acquired before the pump voltage Vp is reduced, and the atmospheric pressure Paa acquired after the pump voltage Vp is restored, is outside a predetermined range. The diagnosis unit 274 performs the same processing in relation to the oxygen concentration DO. According to such a configuration, deterioration diagnosis of the gas sensor 4 is prohibited when the atmospheric pressure Pa and the oxygen concentration DO fluctuate greatly during deterioration diagnosis, and the accuracy of deterioration diagnosis can consequently be improved.

(First Modification)

Next, a first modification of the control device 5 of the gas sensor 4 of the first embodiment will be described.

In the control device 5 of the present modification, instead of a configuration that uses the atmospheric pressure Pa as the exhaust pressure Pe, the exhaust pressure Pe is directly detected by an exhaust pressure sensor. Specifically, as shown by the broken line in FIG. 1, an exhaust pressure sensor 6 that detects the exhaust pressure Pe is provided in the exhaust passage 1. The control device 5 uses the exhaust pressure Pe detected by the exhaust pressure sensor 6 as a correction parameter. According to such a configuration, because the exhaust pressure Pe can be detected with higher accuracy than a configuration that uses the atmospheric pressure Pa detected by the atmospheric pressure sensor 52 as the exhaust pressure Pe, the calculation accuracy of the correction coefficient $\alpha$ can be increased. As a result, the accuracy of deterioration diagnosis of the gas sensor 4 can be improved.

(Second Modification)

Next, a second modification of the control device 5 of the gas sensor 4 of the first embodiment will be described.

Figure 11:
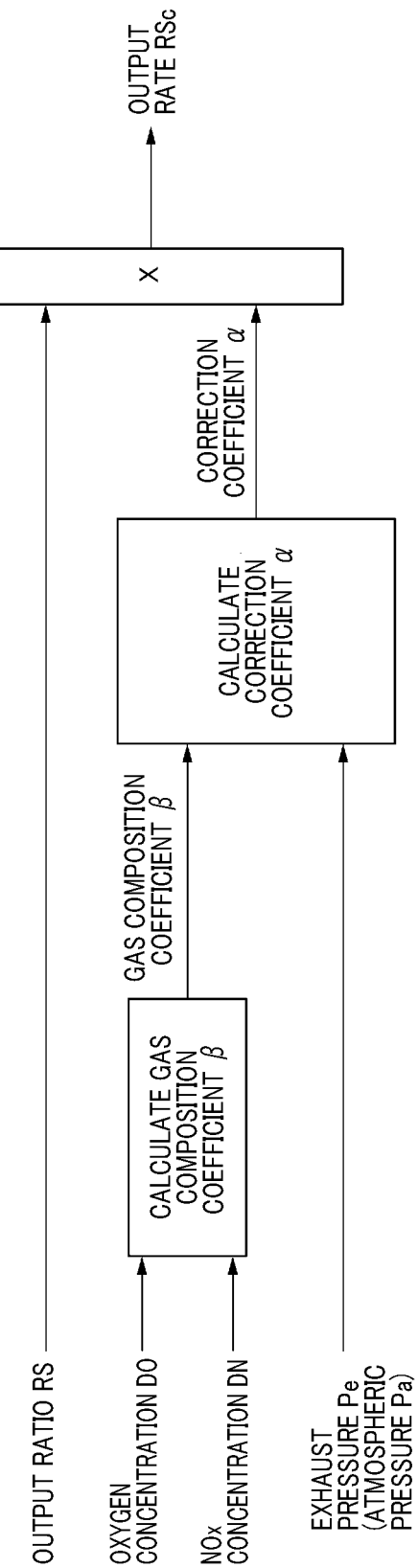
FIG. 11 is a diagram showing an outline of an output ratio correction executed by a correction unit of a second modification according to the first embodiment.
Figure 12:
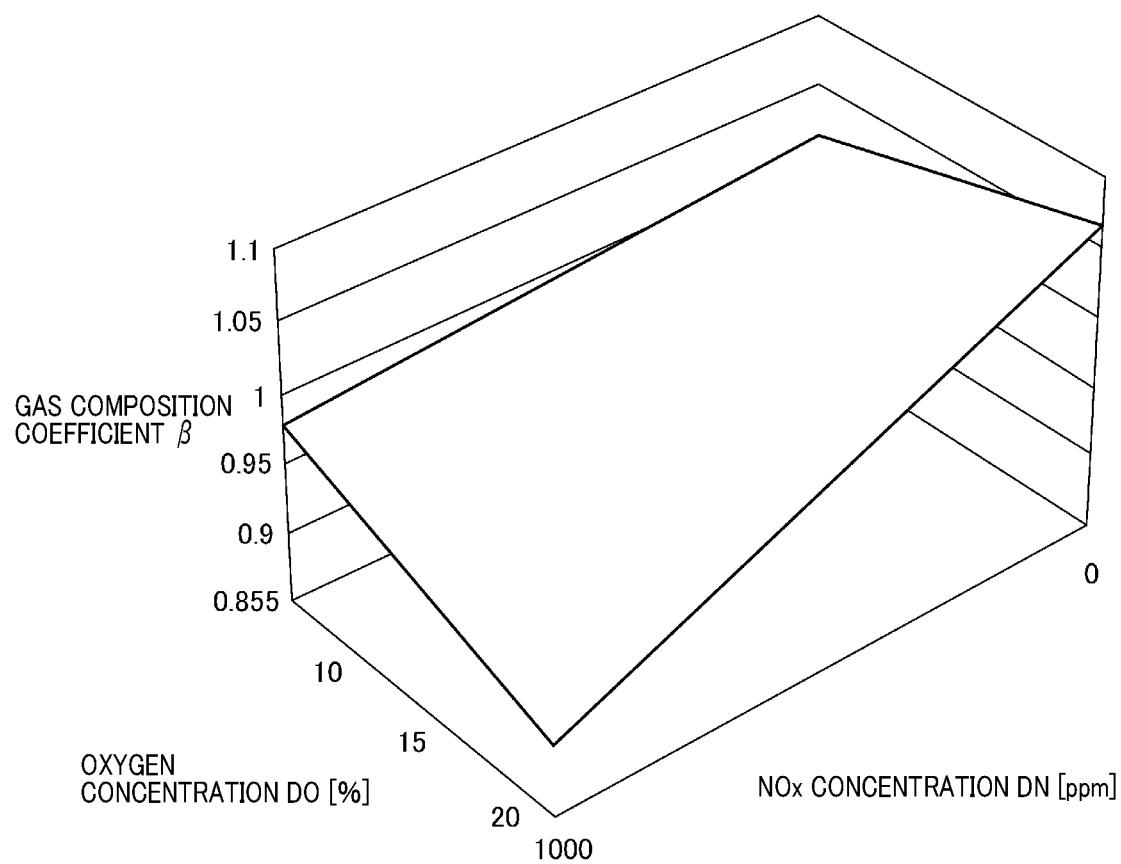
FIG. 12 is a map showing the relationship between an oxygen concentration DO, a NOx concentration DN, and a gas composition coefficient β used in the gas sensor of the second modification according to the first embodiment.

The control device 5 of the present modification uses not only the oxygen concentration DO, but also a NOx concentration DN as the gas composition of the exhaust gas, which is used as a correction parameter. Specifically, as shown in FIG. 11, the correction unit 275 calculates a gas composition coefficient $\beta$ based on the oxygen concentration DO and the NOx concentration DN. Specifically, the memory 271 of the microcomputer 27 stores in advance a map such as that shown in FIG. 12, which represents the relationship between the oxygen concentration DO, the NOx concentration DN, and the gas composition coefficient $\beta$. The correction unit 275 uses the map shown in FIG. 12 to calculate the gas composition coefficient $\beta$ from the oxygen concentration DO and the NOx concentration DN.

Figure 13:
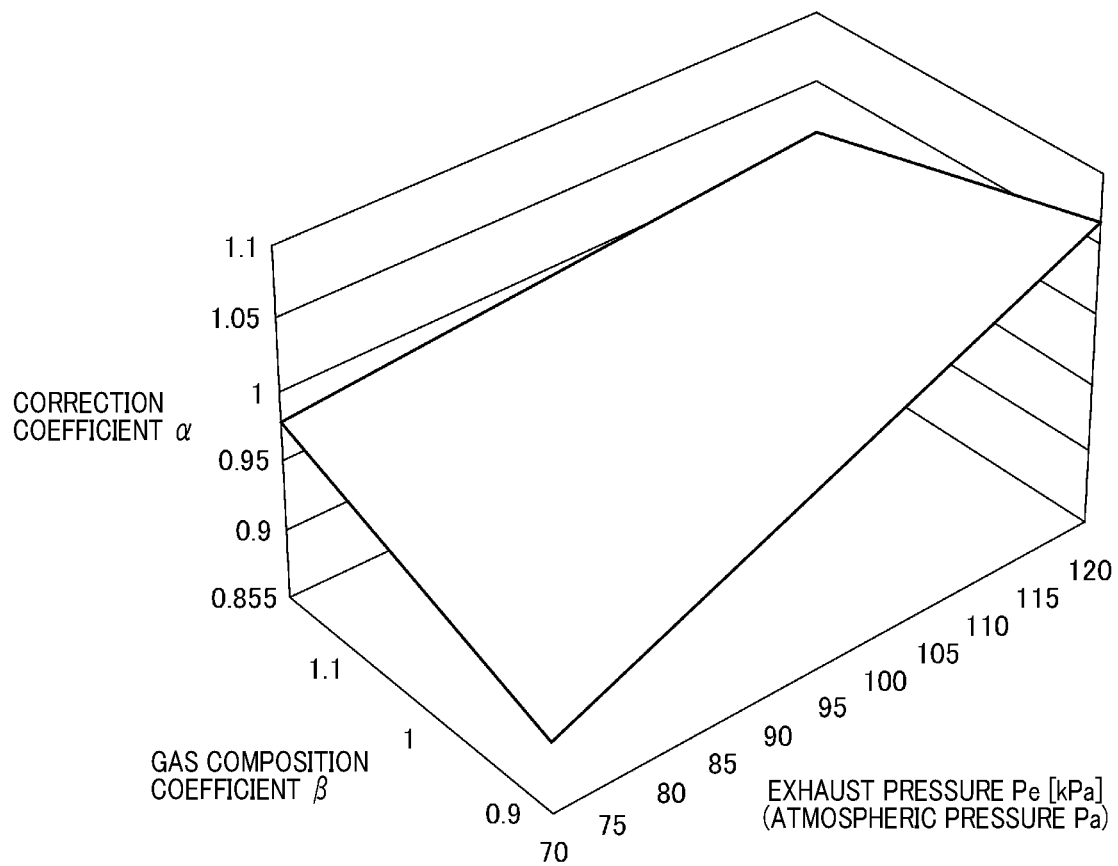
FIG. 13 is a map showing the relationship between a gas composition coefficient β, an exhaust pressure Pe, and a correction coefficient α used in the gas sensor of the second modification according to the first embodiment.

Furthermore, as shown in FIG. 11, the correction unit 275 calculates the correction coefficient $\alpha$ based on the gas composition coefficient $\beta$ and the atmospheric pressure Pa. Specifically, the memory 271 of the microcomputer 27 stores in advance a map such as that shown in FIG. 13, which represents the relationship between the gas composition coefficient $\beta$, the atmospheric pressure Pa, and the correction coefficient $\alpha$. The correction unit 275 uses the map shown in FIG. 13 to calculate the correction coefficient $\alpha$ from the gas composition coefficient $\beta$ and the atmospheric pressure Pa.

According to such a configuration, because the influence of the NOx concentration DN can be reflected in the correction coefficient $\alpha$ in addition to the influence of the oxygen concentration DO, a correction coefficient $\alpha$ having a higher accuracy can be calculated. Consequently, because the calculation accuracy of the corrected output ratio RSc calculated from the output ratio RS and the correction coefficient $\alpha$ can be improved, the accuracy of deterioration diagnosis of the gas sensor 4 can be improved.

(Third Modification)

Next, a third modification of the control device 5 of the gas sensor 4 of the first embodiment will be described.

The control device 5 of the present modification uses a convergence value Ic of the sensor current Is instead of the time change amount A of the sensor current Is in the processing of step S15 shown in FIG. 8. Specifically, as shown in FIGS. 6(A) and 6(B), if the pump voltage Vp is temporarily reduced at time t10, the sensor current Is gradually increases with time after time t10, and converges to a predetermined value Ic. When the sensor cell 14 deteriorates, the convergence value Ic decreases. Therefore, even when the convergence value Ic is used instead of the time change amount A of the sensor current Is, it is possible to diagnose deterioration of the gas sensor 4 in the same manner. In the present modification, the convergence value Ic corresponds to an output value of the second cell.

Second Embodiment

Next, a second embodiment of the control device 5 of the gas sensor 4 will be described. Hereinafter, the aspects in which the control device 5 of the gas sensor 4 differs from that of the first embodiment will be mainly described.

Instead of a configuration that corrects the output ratio RS, which is used as the determination value of deterioration diagnosis, the control device 5 of the present embodiment has a configuration that corrects the time change amount A of the sensor current Is, which is an output value of the sensor cell 14.

Figure 14:
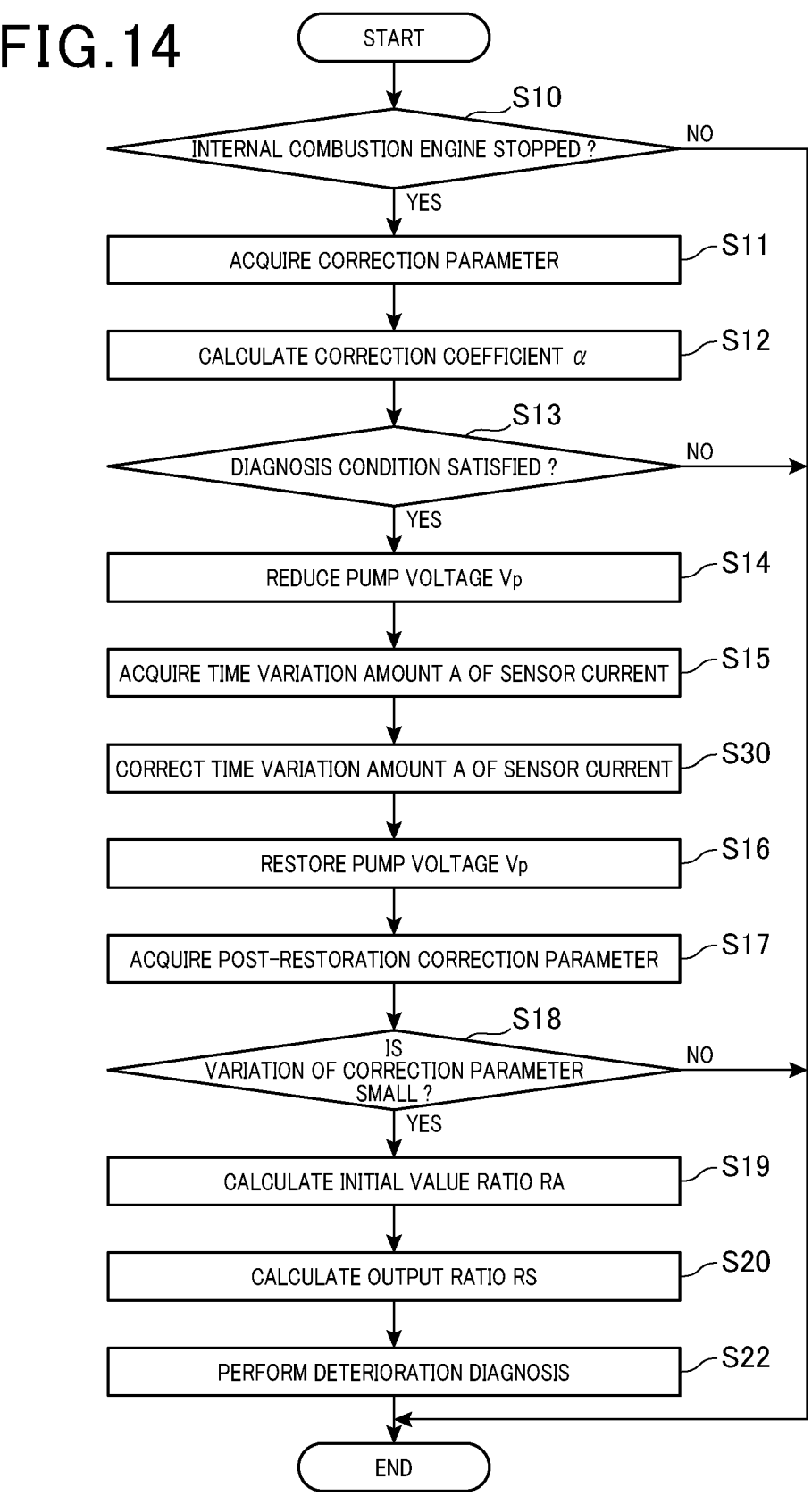
FIG. 14 is a flowchart showing the sequence of diagnostic processing executed by a gas sensor control device according to a second embodiment.

Specifically, as shown in FIG. 14, in the diagnosis processing of the present embodiment, the processing of step S21 shown in FIG. 9, that is to say, the processing that corrects the output ratio RS, is omitted.

In contrast, in the diagnosis processing shown in FIG. 14, after the determination value acquisition unit 273 calculates the time change amount A of the sensor current Is in the processing of step S15, the correction unit 275 calculates a corrected time change amount Ac of the sensor current by multiplying the time change amount A of the sensor current Is and the correction coefficient $\alpha$ as the processing of step S30.

Furthermore, the determination value acquisition unit 273 calculates an initial value ratio RA by dividing the corrected time change amount Ac of the sensor current Is by the initial value A0 as the processing of step S19.

The control device 5 of the gas sensor 4 having the configuration of the present embodiment is capable of obtaining equivalent or similar actions and effects as the control device 5 of the gas sensor 4 of the first embodiment.

Third Embodiment

Next, a third embodiment of the control device 5 of the gas sensor 4 will be described. Hereinafter, the aspects in which the control device 5 of the gas sensor 4 differs from that of the first embodiment will be mainly described.

Instead of a configuration that corrects the output ratio RS, which is used as the determination value of deterioration diagnosis, the control device 5 of the present embodiment has a configuration that corrects the determination threshold RSth.

Figure 15:
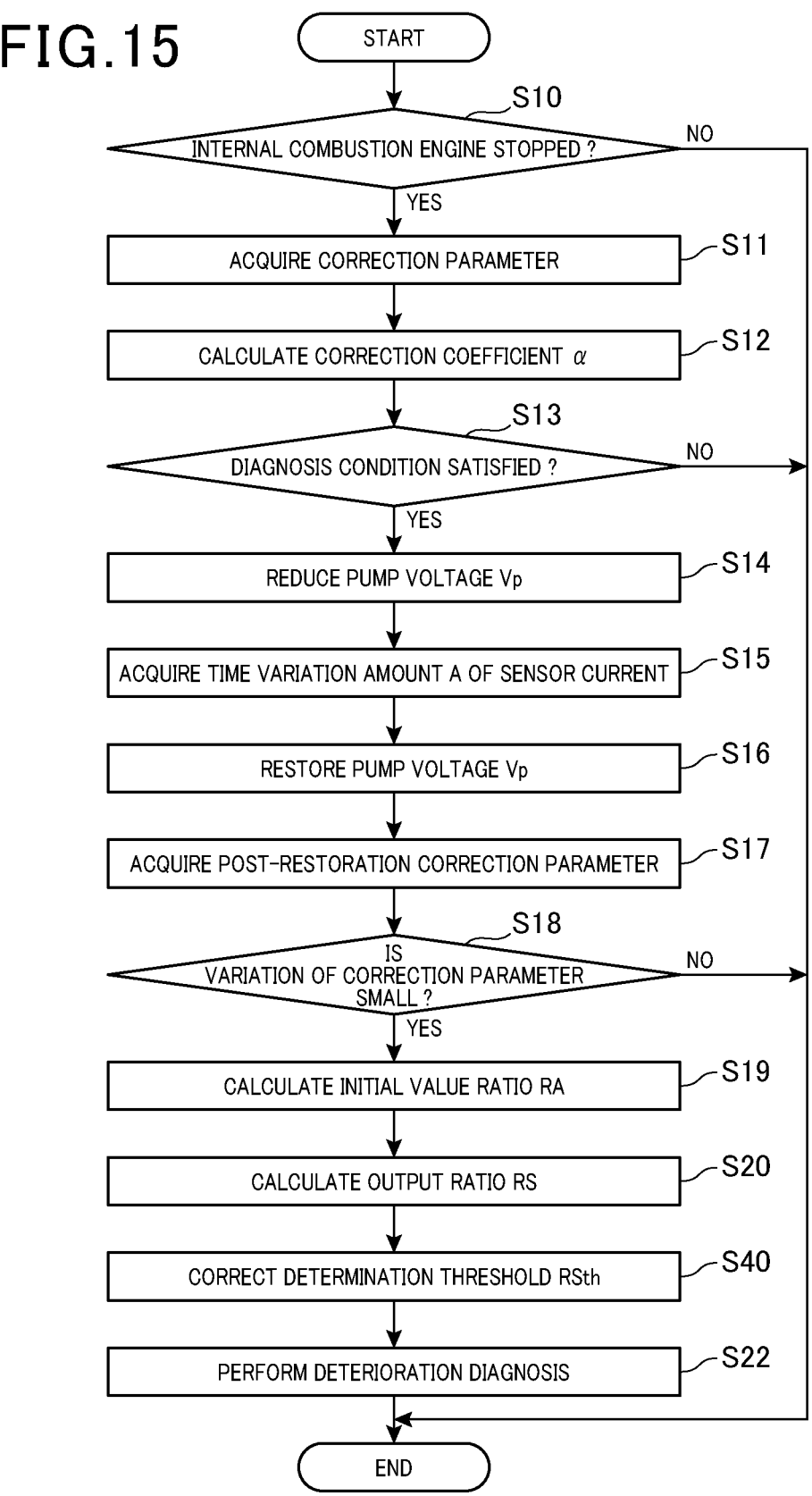
FIG. 15 is a flowchart showing the sequence of diagnostic processing executed by a gas sensor control device according to a third embodiment.

Specifically, as shown in FIG. 15, in the diagnosis processing of the present embodiment, the processing of step S21 shown in FIG. 9, that is to say, the processing that corrects the output ratio RS, is omitted.

On the other hand, in the diagnosis processing shown in FIG. 15, after the determination value acquisition unit 273 calculates the output ratio RS in the processing of step S20, the correction unit 275 calculates a corrected determination threshold RSthc by multiplying the determination threshold RSth and the correction coefficient α as the processing of step S40. The diagnosis unit 274 diagnoses deterioration of the gas sensor 4 based on a comparison of the output ratio RS and the corrected determination threshold RSthc as the processing of step S22.

The control device 5 of the gas sensor 4 having the configuration of the present embodiment is capable of obtaining equivalent or similar actions and effects as the control device 5 of the gas sensor 4 of the first embodiment.

Fourth Embodiment

Next, a fourth embodiment of the control device 5 of the gas sensor 4 will be described. Hereinafter, the aspects in which the control device 5 of the gas sensor 4 differs from that of the first embodiment will be mainly described.

The correction parameters used for obtaining the correction coefficient α, in particular, the exhaust pressure Pe and the oxygen concentration DO, are correlated with state quantities of the internal combustion engine 2 such as the rotational speed and load of the internal combustion engine 2. Using this, in the present embodiment, the rotational speed and load of the internal combustion engine 2 are used instead of the exhaust pressure Pe and the oxygen concentration DO.

Figure 16:
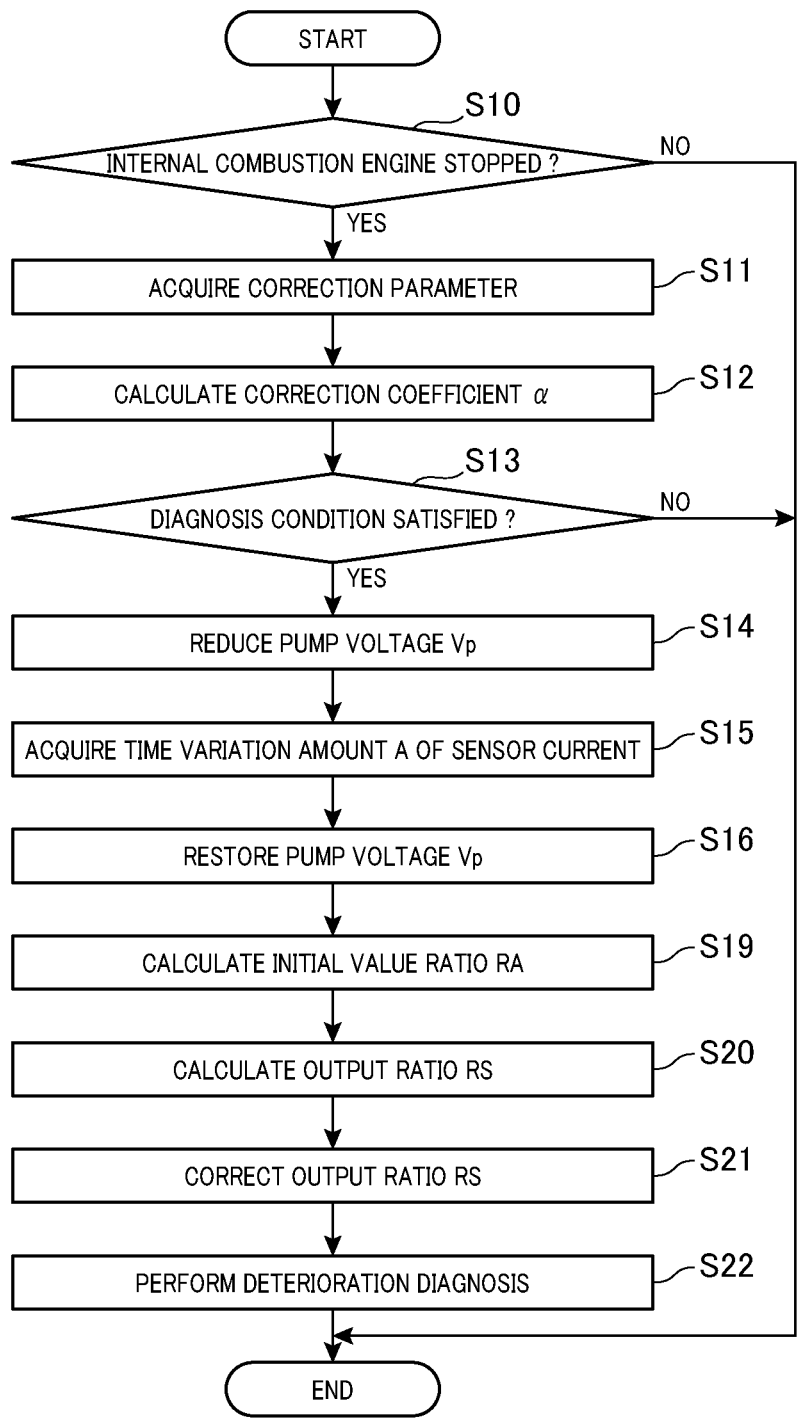
FIG. 16 is a flowchart showing the sequence of diagnostic processing executed by a gas sensor control device according to a fourth embodiment.

Specifically, as shown in FIG. 16, if the diagnosis unit 274 makes an affirmative determination in the processing of step S10, that is to say, when the internal combustion engine 2 is stopped, the determination value acquisition unit 273 acquires correction parameters for calculating the correction coefficient α as the processing of step S11. The rotational speed Ne and the load Le of the internal combustion engine 2 immediately before the internal combustion engine 2 is stopped are used as correction parameters. The load Le is a numerical value of the load state of the internal combustion engine 2.

Specifically, the determination value acquisition unit 273 detects the rotational speed Ne of the internal combustion engine 2 based on an output signal of a crank angle sensor 50. Furthermore, the load state of the internal combustion engine has a correlation with, for example, the rotational speed Ne and intake air amount Ga of the internal combustion engine 2. Therefore, by using a map or the like, the determination value acquisition unit 273 acquires the load Le of the internal combustion engine 2 from the rotational speed Ne of the internal combustion engine 2, which can be acquired based on the output signal of the crank angle sensor 50, and the intake air amount Ga of the internal combustion engine 2, which can be acquired based on the output signal of an air flow meter 51. The load Le is set such that the value increases as the internal combustion engine 2 goes to a high load state, and the value decreases as the internal combustion engine 2 goes to a low load state.

Figure 17:
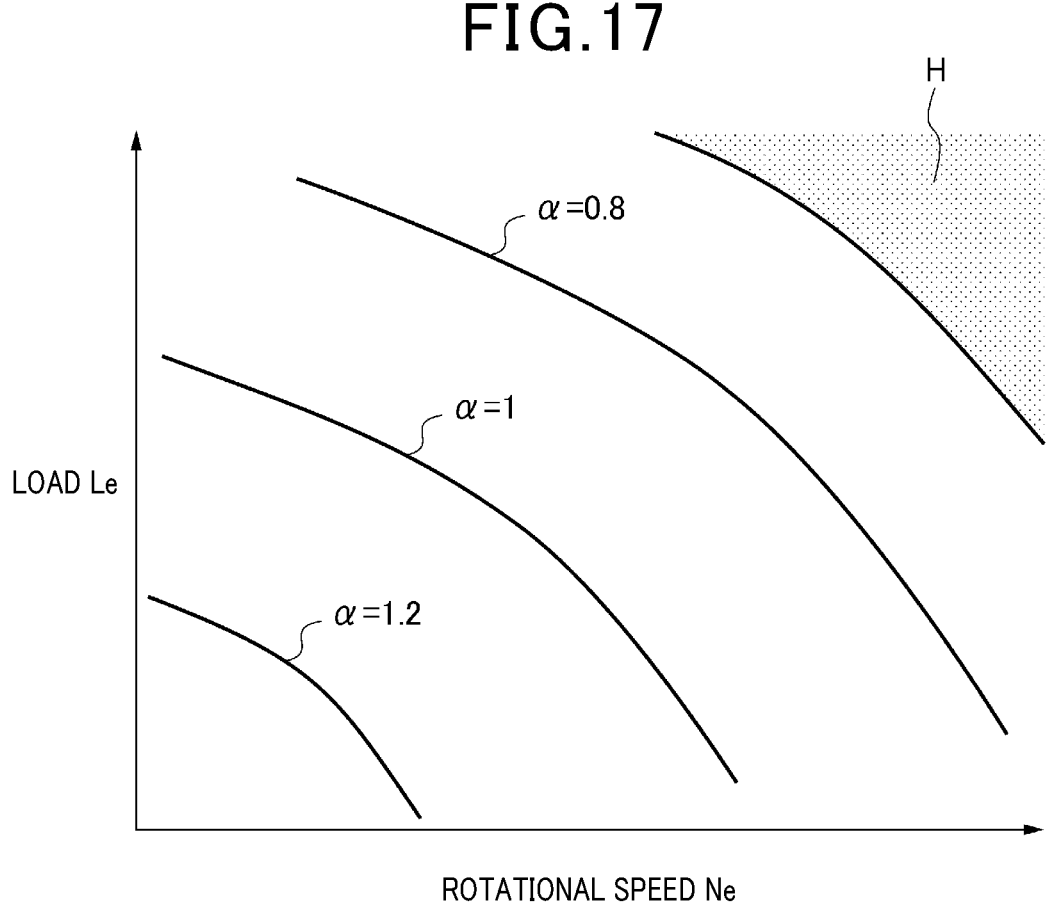
FIG. 17 is a map showing the relationship between a rotational speed Ne of an internal combustion engine, a load Le of an internal combustion engine, and a correction coefficient α used in a gas sensor of the fourth embodiment.

As the processing of step S12 following step S11, the correction unit 275 calculates the correction coefficient α from the rotational speed Ne and load Le of the internal combustion engine 2, which are correction parameters. Specifically, the memory 271 of the microcomputer 27 stores in advance a map such as that shown in FIG. 17, which represents the relationship between the rotational speed Ne and load Le of the internal combustion engine 2, and the correction coefficient α. The correction unit 275 uses the map shown in FIG. 17 to calculate the correction coefficient α from the rotational speed Ne and load Le of the internal combustion engine 2.

Then, as the processing of step S13, the diagnosis unit 274 determines whether or not a diagnosis state is satisfied. At that time, the diagnosis unit 274 uses the condition represented by (a4) below instead of the condition represented by (a3) described above.

(a4) The correction parameters are outside a predetermined range. Specifically, the diagnosis unit 274 determines whether or not the rotational speed Ne and load Le of the internal combustion engine 2, which are correction parameters, are outside a predetermined range. For example, when the rotational speed Ne and load Le of the internal combustion engine 2 take values in a region H indicated by the dot hatching in FIG. 17, it is determined that the correction parameters are outside the predetermined range.

Specifically, in the diagnosis processing shown in FIG. 16, the processing of steps S17 and S18 shown in FIG. 9 are omitted.

The control device 5 of the gas sensor 4 having the configuration of the present embodiment is capable of obtaining equivalent or similar actions and effects as the control device 5 of the gas sensor 4 of the first embodiment.

Other Embodiments

Each of the embodiments may also be implemented in the following forms.

In the control device 5 of the gas sensor 4 of the fourth embodiment, it is possible to use an arbitrary parameter which is different from the rotational speed Ne and the load Le as the state quantity of the internal combustion engine 2.

The configuration of the gas sensor 4 of each embodiment is also applicable to gas sensors which are not provided with a monitor cell 15.

The control device 5 and the control method described in the present disclosure may be realized by one or more dedicated computers which are provided having a configuration with a processor and memory, which are programmed so as to execute one or more functions embodied by computer programs. The control device 5 and the control method described in the present disclosure may be realized by a dedicated computer provided having a configuration with a processor including one or more dedicated hardware logic circuits. The control device 5 and the control method described in the present disclosure may be realized by one or more dedicated computers which are configured by a combination of a processor and memory, which are programmed so as to execute one or more functions, and a processor including one or more hardware logic circuits. The computer program may be stored in a computer-readable, non-transitory tangible recording medium as instructions which are executed by the computer. The dedicated hardware logic circuits and hardware logic circuits may be realized by a digital circuit or analog circuit including a plurality of logic circuits.

The present disclosure is not limited to the specific examples described above. Appropriate design changes made to the specific examples by those skilled in the art are also included in the scope of the present disclosure, as long as they have the features of the present disclosure. Each of the elements included in the specific examples described above, and the arrangement, conditions, shape, and the like are not limited to those that are illustrated, and may be appropriately changed. Each of the elements included in the specific examples described above can be appropriately combined as long as no technical contradiction occurs.

What is claimed is:

1. A gas sensor control device that diagnoses deterioration of a gas sensor having a first cell, which removes oxygen contained in an exhaust gas of an internal combustion engine of a vehicle, and a second cell, which outputs a current corresponding to a concentration of a specific gas contained in the exhaust gas from which oxygen has been removed by the first cell, the gas sensor control device comprising:
   a control unit that temporarily reduces an oxygen removing capability of the first cell;
   a determination value acquisition unit that acquires a determination value for diagnosing deterioration of the gas sensor based on an output value of the second cell in a state where the oxygen removal capability of the first cell has been temporarily reduced;
   a diagnosis unit that performs deterioration diagnosis of the gas sensor by comparing the determination value with a determination threshold; and
   a correction unit that sets a correction parameter based on at least one of an exhaust pressure, an atmospheric pressure, and a gas composition of an exhaust gas, and corrects any one of the output value, the determination value, and the determination threshold based on the correction parameter.

2. The gas sensor control device according to claim 1, wherein
   the correction unit calculates a correction coefficient based on the correction parameter, and corrects any one of the output value, the determination value, and the determination threshold by multiplying the correction coefficient by any one of the output value, the determination value, and the determination threshold value.

3. The gas sensor control device according to claim 1, wherein
   the diagnosis unit performs deterioration diagnosis of the gas sensor after the internal combustion engine is stopped, and
   the correction unit uses at least an atmospheric pressure as the correction parameter.

4. The gas sensor control device according to claim 3, wherein
   the correction unit corrects the determination value such that the determination value becomes smaller as an atmospheric pressure decreases.

5. The gas sensor control device according to claim 1, wherein
   the correction unit uses at least one of an oxygen concentration and a nitrogen oxide concentration as a gas composition of the exhaust gas.

6. The gas sensor control device according to claim 1, wherein
   the correction unit performs correction of any one of the output value, the determination value, and the determination threshold when the correction parameter is within a predetermined range, and
   the diagnosis unit prohibits deterioration diagnosis of the gas sensor if any one of the following conditions are satisfied: the correction parameter is outside the predetermined range; the gas sensor is in a non-activated state; or an abnormality has occurred in the gas sensor.

7. The gas sensor control device according to claim 1, wherein
   the diagnosis unit prohibits deterioration diagnosis of the gas sensor when a deviation between the correction parameter acquired before the oxygen removal capability of the first cell has been temporarily reduced, and the correction parameter acquired after the oxygen removal capability of the first cell has been restored is outside a predetermined range.

8. A gas sensor control device that diagnoses deterioration of a gas sensor having a first cell, which removes oxygen contained in an exhaust gas of an internal combustion engine of a vehicle, and a second cell, which outputs a current corresponding to a concentration of a specific gas contained in the exhaust gas from which oxygen has been removed by the first cell, the gas sensor control device comprising:
   a control unit that temporarily reduces an oxygen removing capability of the first cell;
   a determination value acquisition unit that acquires a determination value for diagnosing deterioration of the gas sensor based on an output value of the second cell in a state where the oxygen removal capability of the first cell has been temporarily reduced;
   a diagnosis unit that performs deterioration diagnosis of the gas sensor by comparing the determination value after stopping the internal combustion engine with a determination threshold; and
   a correction unit that sets a correction parameter based on a state quantity of the internal combustion engine before stopping the internal combustion engine, and corrects any one of the output value, the determination value, and the determination threshold based on the correction parameter.

9. The gas sensor control device according to claim 8, wherein
   the correction unit performs correction of any one of the output value, the determination value, and the determination threshold when a state quantity of the internal combustion engine before stopping the internal combustion engine is within a predetermined range, and
   the diagnosis unit prohibits deterioration diagnosis of the gas sensor if a state quantity of the internal combustion engine is outside the predetermined range.

10. The gas sensor control device according to claim 1, wherein
   the control unit temporarily reduces an oxygen removal capability of the first cell by reducing an applied voltage of the first cell; and
   the determination value acquisition unit calculates, as an output value of the second cell, a parameter representing a transient response behavior of a current value output from the second cell when the oxygen removal capability of the first cell is temporarily reduced.

* * * * *